17# United States Patent Office 2,851,359
Patented Sept. 9, 1958

2,851,359

EFFERVESCIVE POWDERS FOR PRODUCING PROTRACTED EBULLITION

Isaac M. Diller, Brooklyn, N. Y., assignor to Henry Brout, Larchmont, N. Y.

No Drawing. Application March 25, 1954
Serial No. 418,745

12 Claims. (Cl. 99—78)

This invention relates to effervescive materials for producing protracted ebullition.

More particularly, my invention pertains to a dry material, sometimes known as a concentrate, which is designed to be added to tap water for the production of a carbonated soft drink. Many such concentrates have been proposed but, to date, for a variety of reasons, none have been commercially successful.

One of the necessary properties in a concentrate of this type is the ability to produce prolonged visible and sparkling ebullition. Some of the proposed concentrates were reasonably satisfactory in this respect; however, they presented other and substantial problems in flavor and physiological reactions. Concentrates essentially include a carbonate factor and an acid factor, it being the acid factor which created the aforesaid problem.

The only acid which, with its inevitable salts produces a dring of satisfactory flavor, is not attended by bad physiological reactions and is economical, is phosphoric acid and its salts. This acid and its salts have a relatively bland taste and can be blended with conventional flavoring agents and colors to produce a satisfactory soft drink. Indeed, if admixed in proper proportions they enhance the flavor of such drinks. However, phosphates in general have tended either to give too quick a reaction or to create such a delayed ebullition as to be unusable for carbonated drinks. Phosphoric acid itself whics is particularly desirable is a liquid and reacts far too quickly with the carbonate factor. By the time the carbonate factor and phosphoric acid have been stirred into the solution, the sparkle has reached its ebb so that a concentrate including commercial phosphoric acid is of no value for this purpose unless suitably modified as herein stated.

Attempts to delay the reaction by raising the pH of the concentrate with phosphate buffering salts, e. g. monosodium acid orthophosphate and monoammonium acid orthophosphate did not create the desired prolonged ebullition, and, moreover, resulted in either an excessively high pH (weak acidity) in the drink or an excessive and distasteful quantity of reactants.

It is an object of my invention to provide a concentrate employing an acid factor which is not subject to any of the foregoing drawbacks.

More specifically, it is an object of my invention to provide a concentrate of the character described utilizing a phosphate acid factor of such nature that the ensuing carbonated soft drink has a long, visible and sparkling ebullition.

It is another object of my invention to provide a concentrate of the character described utilizing a phosphate acid factor of such nature that the reactants in the drink do not have an unpleasant taste and blend well with the flavors present in the concentrate.

Another object of my invention is to provide a concentrate of the character described employing a relatively inexpensive phosphate acid factor.

Other objects of my invention in part will be obvious and in part will be pointed out hereinafter.

My invention accordingly consists in the combination of compounds of which the scope of application will be indicated in the appended claims.

I have found that the desired ebullition can be obtained by including in the acid factor a compound which is known to the art as hemisodium phosphate. This compound has the empirical formula $NaH_5(PO_4)_2$ and is understood by the art to be and is described in the literature as an addition compound of orthophosphoric acid and monosodium acid orthophosphate, the formula accordingly being $NaH_2PO_4 \cdot H_3PO_4$.

The effects attained with the hemisodium phosphate were so markedly different from those secured with other phosphate acid factors that I investigated the use of this compound in effervescive concentrates. I determined that where presumably stoichiometrically equivalent amounts of orthophosphoric acid and monosodium acid phosphate were employed the results, contrary to prior theory, were entirely dissimilar to those of hemisodium phosphate. For example, with hemisodium phosphate constituting a substantial proportion of the acid factor the rate of ebullition following initial mixing was less than one-half of that secured with, presumably, stoichiometrically equivalent amounts of orthophosphoric acid and monosodium acid orthophosphate. Of more importance was the fact that, with hemisodium phosphate, ebullition remained visible, scintillating and sparkling for from twice to four times as long as with said stoichiometrically equivalent compounds.

In order to determine the cause of the unexpected result, I made pH, conductance, and reaction rate studies, and, in addition, I observed the appearance and behavior of the new acid factor as well as of the reacting or ebulliating beverage secured with the factor. From these studies it now is clear that hemisodium phosphate is not, as formerly thought, an addition compound of monosodium acid phosphate and orthophosphoric acid but rather is a complex consisting of metaphosphoric acid, monosodium acid orthophosphate and one water of crystallization, as expressed by the formula $$HPO_3 \cdot NaH_2PO_4 \cdot H_2O$$

This constitution accounts for all the phenomena observed in my studies. Thus the pH of hemisodium phosphate is somewhat higher than that of the stoichiometrically equivalent proportions of monosodium acid phosphate and orthophosphoric acid. The apparent conductance of hemisodium phosphate is higher than that of the hitherto supposed equivalent compounds. Crystals of hemisodium phosphate can be blotted by several weeks of contact with absorbent paper. Most important of all, the reacting solution exhibits, at least to a slight extent, a colloidal appearance. The final pH of a typical reacted beverage produced from a concentrate including hemisodium phosphate is about 3.8. The pH of reacted beverage using stoichiometrically equivalent amounts of monosodium acid orthophosphate and orthophosphoric acid is 3.5. I titrated hemisodium phosphate against ammonium bicarbonate to a pH of 3.8 and I similarly titrated stoichiometric amounts of the hitherto presumed equivalents, i. e. monosodium acid orthophosphate and orthophosphoric acid. The latter required more alkali by an amount which is accounted for by assuming a molecule of water of crystallization attached to the monosodium acid orthophosphate in the complex.

It is well known that monosodium acid orthophosphate is highly soluble. Metaphosphoric acid is very slowly soluble being slowly converted into orthophosphoric acid after it dissolves. Indeed, pellets of metaphosphoric acid can be soaked in water for weeks without obtaining more than a slight dissolution.

I believe that hemisodium phosphate, consisting as it does of a complex including a highly soluble phosphate and a slowly soluble compound having a phosphate radical, will, when placed in water, have the highly soluble phosphate enter into solution thereby quickly releasing the slowly soluble compound dispersed as extremely tiny particles of colloidal or sub-colloidal size. Indeed, each particle of the slowly soluble compound may be no more than one small moecule in size. In other words when the complex is placed in water it breaks up as the highly soluble phosphate dissolves and leaves the slowly soluble compound. The slowly soluble compound hence will be in a very fine state of dispersion and will not have the normal characteristics of a pellet of such compound. The slowly soluble compound in colloidal state will hydrate far more rapidly than in bulk form and, therefore, will react with the carbonate factor present in the solution. On the other hand, the reaction will not be as quick as with a highly soluble phosphate acid factor but is slow enough to produce the desired protracted ebullition. The setting up of a reactive colloid makes possible slow reaction despite an apparently completely dissolved beverage concentrate.

Moreover, since the acid factor reacts as minute particles they will form points or seeds for bubble formation. Without such points bubbles become visible only as a consequence of agglomeration. With the points the bubbles grow from a barely discernible size as in the best of pressure packed carbonated beverages.

Accordingly, it is an aspect of my invention to provide for the acid factor of an effervescive powder a complex such as a polyphosphate including a highly soluble phosphate portion and a slowly soluble portion having an acid radical, preferably a metaphosphoric acid radical.

The amount of gas evolved with the hemisodium phosphate in 30 minutes is less than one-half that evolved with the hitherto apparently equivalent other compounds. The total amount of gas available as determined by hard stirring in a sealed reaction chamber leading to a gas burette from both the hemisodium phosphate and the apparently equivalent compounds approaches the theoretical in either case. However, with the hemisodium phosphate the ebullition is far more protracted and visible. This means that when a beverage made from hemisodium phosphate is taken into the mouth the consequent mechanical action and temperature rise to which the beverage is subjected will bring about quick ebullition and give rise in the mouth to the "soda" feeling, which is considered desirable in such a beverage. The rate of release of bubbles from a solution prepared with hemisodium phosphate is quite close to that of the most widely used pressure packed carbonated beverages.

The complex employed must have a pH lying between 1.6 and 4.5.

Although I have, in discussing the preferred acid factor to be used in accordance with my invention, particularly mentioned a sodium polyphosphate, i. e. hemisodium phosphate, it will be understood that other alkali type substances can be employed such, for instance, as potassium and ammonium polyphosphates.

The carbonate factor is conventional, consisting for example of sodium, potassium or ammonium carbonate of bicarbonate or mixtures thereof.

It will be understood that the entire acid factor need not constitute hemisodium phosphate alone. My invention is achieved where the polyphosphate of the character described is present in substantial proportions, i. e. at least 10% by weight of the acid factor. There also can be used in combination therewith solid acids, encapsulated or adsorbed liquid acids and acid salts, e. g. orthophosphoric acid and its salts, citric acid and its salts and tartaric acid and its salts. All that is required of these additional constituents is that they be highly soluble or dispersible in a manner tantamount to solution, and that the end products be palatable in combination with the other ingredients, e. g. the flavors, colors and sugars.

It may be mentioned that where I have used the expression "highly soluble" I denote a solid of which a small amount, for instance, a gram, present in the form of a powder or small crystals of the approximate size of granulated sugar, will dissolve in about a minute or less in water at about 45° F.

I prefer to employ mixtures of the acid factor and mixtures of the carbonate factor, that is to say, more than one compound in the acid factor and more than one compound in the carbonate factor, in order to increase both the rate of solution and the palatability so that no one single ion is present in so great an amount that its presence dominates the flavor of the beverage.

The combination of ingredients making up the carbonate factor and the acid factor are so selected that the desired ultimate pH will be obtained and that there will be a proper blend of tastes. The presence of a semi soluble polyphosphate of the character described will insure that the ebullition takes place over a protracted period of time. It should be observed that with the use of hemisodium phosphate a typical ebullition period is about 40 minutes throughout which the bubbling is continuous, visible and vigorous.

I have found that ebullition can be prolonged still further by having the highly soluble portion of either factor dissolved before the highly soluble portion of the other, and that superior results are obtained where the first dissolved factor is the acid factor. Such differential solvation can be secured by introducing one of the factors into water ahead of the other. Inasmuch as this involves the disadvantage of packaging two powders separately I may modify either factor so as to delay its solvation whereby the two factors can be admixed dry and added to water as a single powder. One manner of accomplishing the result is to encapsulate either factor, for instance the carbonate factor. The compounds comprising this factor can be encapsulated in or coated with an edible-fluid-dispersible material, i. e. a material which is dissolved or finely disintegrated by edible fluids, the thickness of the capsule or coating being sufficient to prevent solution of the protected compounds for approximately 15 seconds. Typical coating or encapsulating substances are sugar, hydroxylethyl cellulose, gelatin, gum arabic, gum tragacanth, and solid polyethylene glycol. In addition to delaying solvation of the carbonate factor the coating agent inhibits any tendency toward dry reaction.

An alternate method for accomplishing preferential solution of one or the other factors is to employ different grain sizes. Thus one factor may constitute grains or particles substantially larger than the other, e. g., 100 times or more larger in volume. Such variation in size preferably is employed in conjunction with encapsulation or coating of the factor which is present in the larger grain size.

By way of example, a soft carbonated drink embodying my invention is prepared by adding to six ounces of tap water a composition consisting of one gram of orthophosphoric acid, one gram of hemisodium phosphate, and one gram of monoammonium acid carbonate, together with the usual flavoring, color and sweetening, e. g. sugar. This drink will bubble continuously and satisfactorily for more than half an hour.

I also have prepared satisfactory carbonated drinks using the hemisodium phosphate alone as the acid factor.

Another example of a suitable concentrate for preparing a six ounce soft drink is 1.2 grams of a carbonate factor comprising a mixture consisting half and half of monoammonium acid carbonate and monosodium acid carbonate. The acid factor consists of two grams including half gram of orthophosphoric acid, half gram of monosodium acid orthophosphate and one gram of hemisodium phosphate. Flavor, coloring and a sweetening agent such as sodium cyclamate also are included.

It should be mentioned that the effervescive material may be of any well known physical form or combination of forms, e. g., solid, powdered, liquid, intermixed, separated, adsorbed and absorbed.

It thus will be seen that I have provided compounds which achieve the several objects of my invention and are well adapted to meet the conditions of practical use.

As various possible embodiments might be made of the above invention, and as various changes might be made in the embodiments above set forth, it is to be understood that all matter herein described is to be interpreted as illustrative and not in a limited sense.

Having thus described my invention, I claim as new and desire to secure by Letters Patent:

1. An effervescive material comprising a carbonate factor and an addition complex including a highly soluble phosphate portion and a slowly soluble phosphate portion constituting a phosphate acid.

2. An effervescive material comprising a carbonate factor and an addition complex including a highly soluble phosphate portion and a slowly soluble portion constituting a metaphosphoric acid.

3. An effervescive material comprising a carbonate factor and an addition complex including a highly soluble phosphate portion with a water of crystallization and a slowly soluble portion constituting a metaphosphoric acid.

4. An effervescive material comprising a carbonate factor and an addition complex including a highly soluble orthophosphate portion and a metaphosphoric acid portion.

5. An effervescive material comprising a carbonate factor and hemisodium phosphate.

6. An effervescive material comprising a carbonate factor and an addition complex including a highly soluble carrier portion and a slowly soluble portion constituting an acid whereby when the complex is dissolved the slowly soluble portion readily will be dispersed in colloidal form.

7. An effervescive material comprising a carbonate factor and an addition complex including a highly soluble phosphate portion and a slowly soluble portion constituting an acid, said complex having a pH between 1.6 and 4.5.

8. An effervescive material comprising a carbonate factor and an acid factor including a highly soluble portion chemically linked to a slowly soluble portion constituting an acid whereby when the material is dissolved the slowly soluble portion readily will be dispersed in colloidal form.

9. An effervescive material comprising a carbonate factor, a polyphosphate including a highly soluble phosphate portion and a slowly soluble portion having an acid radical, and means for delaying solution of the carbonate factor so that the polyphosphate is dissolved substantially before the carbonate factor.

10. An effervescive material comprising a carbonate factor and a complex constituting a metaphosphoric acid portion and a portion consisting of an acid orthophosphate of a substance selected from the group consisting of sodium, potassium and ammonium.

11. An effervescing material including as an acidic factor at least 10% of a complex comprising a highly soluble phosphate portion and a slowly soluble portion having an acid radical.

12. An effervescive material including as an acid factor at least 10% of a complex comprising a metaphosphoric acid portion and a portion constituting an acid orthophosphate of a substance selected from the class including sodium, potassium and ammonium, said acid orthophosphate portion having a water of crystallization.

References Cited in the file of this patent

UNITED STATES PATENTS

| | | |
|---|---|---|
| 315,831 | Peters | Apr. 14, 1885 |
| 2,000,160 | Broeg | May 7, 1935 |
| 2,071,841 | Kelling | Feb. 23, 1937 |
| 2,630,372 | Wright | Mar. 3, 1953 |